United States Patent [19]

Schwab

[11] 4,250,614

[45] Feb. 17, 1981

[54] DEVICE FOR ASSEMBLING LAMINATION STACKS FOR ELECTRIC MACHINES

[75] Inventor: Rolf Schwab, Bischofsheim, Fed. Rep. of Germany

[73] Assignee: Siemens Aktiengesellschaft, Munich, Fed. Rep. of Germany

[21] Appl. No.: 57,020

[22] Filed: Jul. 12, 1979

[30] Foreign Application Priority Data

Jul. 21, 1978 [DE] Fed. Rep. of Germany ....... 2832209

[51] Int. Cl.$^3$ ........................................... H02K 15/02
[52] U.S. Cl. ........................................ 29/732; 29/738; 414/27; 414/104; 414/330
[58] Field of Search .................. 29/732, 738, 596, 609; 414/27, 104, 32, 114, 330

[56] References Cited

U.S. PATENT DOCUMENTS 4,073,373  2/1978  Crowley ................................ 29/738

*Primary Examiner*—Carl E. Hall
*Attorney, Agent, or Firm*—Kenyon & Kenyon

[57] ABSTRACT

A device for assembling lamination stacks for use in electric machines in which a first quantity of laminations is picked off to form the lamination stack and the size of the stack so formed is measured at an intermediate station. Then a second quantity of laminations which depends on the measurement result, is picked up and is added to the first quantity. A transport and pickup device, provided for picking up the second quantity of laminations, is controlled by the measuring device and takes the laminations from a magazine. In order to avoid loading and monitoring the magazine separately, the magazine is provided with at least three storage places which consist of carriers, disposed horizontally at equal angular spacings from each other on a rotatable column. In forming the lamination stack, the first quantity of laminations is picked up from the first carrier and fed to the intermediate station for measurement. The second quantity of laminations is picked up from the carrier which follows next, in the direction of rotation of the column. The next succeeding carrier is kept fully loaded with new laminations. When all laminations have been taken from the first carrier, the column is turned by an angle corresponding to the angular spacing of the carriers.

4 Claims, 4 Drawing Figures

DEVICE FOR ASSEMBLING LAMINATION STACKS FOR ELECTRIC MACHINES

BACKGROUND OF THE INVENTION

1. Field of the Invention

This invention relates to an apparatus for assembling lamination stacks for use in electric machines in which a first quantity of laminations is picked off for forming a lamination stack. The size of the lamination stack so formed is measured at an intermediate station by means of a measuring device, and thereupon the first quantity of laminations is supplemented, depending on the result of the measurement, by a second quantity of laminations to form a final lamination stack. The second quantity is taken from a magazine by means of a transport and pickup device controlled by the measuring device.

DESCRIPTION OF THE PRIOR ART

In an apparatus of this type described in German Auslegeschrift No. 23 06 716, a lamination stack formed by a first number of laminations is weighed at an intermediate station. Depending upon the deviation of the weight of a particular stack from a predetermined weight, additional laminations are taken from a magazine at the intermediate station and are added to the original stack. In this arrangement, the magazine must be replenished in a separate operation and the filling of the magazine must be monitored.

It is an object of the invention to provide a device for fabricating lamination stacks for electric machines in which separate loading and monitoring of the magazine at the intermediate station is not required.

SUMMARY OF THE INVENTION

The problem stated above is solved, in accordance with the teachings of the invention, by providing a magazine which has at least three storage places equally spaced apart from each other on a support. The storage places consist of carriers whose position, relative to the pickup device, can be adjusted and which are carried on the support horizontally or at such an angle that the laminations are held on the carriers by the force of friction. A first quantity of laminations is picked up from a first carrier and is transported to an intermediate station, any necessary second quantity being picked up from a second carrier. The remaining carrier is kept loaded with new laminations so that, when all laminations are taken from the first carrier, all the carriers are advanced by one step to the next station. By providing a magazine having three storage places, it is always possible to pick up the first quantity of laminations at the first storage location and a second quantity of laminations at the next storage location, while the third storage place is being loaded with new laminations. In this way the presence at the storage place of sufficient laminations to make up the second quantity of laminations is assured.

In one advantageous mechanical design embodying the teachings of the invention, the support takes the form of a rotatable column on which the carriers are arranged at equal angular spacings from each other. The column is rotated by an angle corresponding to the angular spacing of the carriers, after all laminations have been removed from the first carrier. It is a feature of the invention that the first quantity of laminations chosen is smaller than the number required for the final stack, and that the laminations added to complete the stack are turned 180° by the pickup device. Lamination stacks in which the stamping burrs point inward on both ends can be thus formed with this device in a simple manner. This prevents damage to windings to be placed later on each stack.

According to a another aspect of the invention, alignment and maintenance of the laminations in a definite position is made possible by means of a guide bar on each carrier which engages a cutout of the laminations, there being also a guide finger for aligning the laminations which is slipped on the guide bar of a carrier when that carrier is loaded.

DETAILED DESCRIPTION OF THE INVENTION

Figure 1:
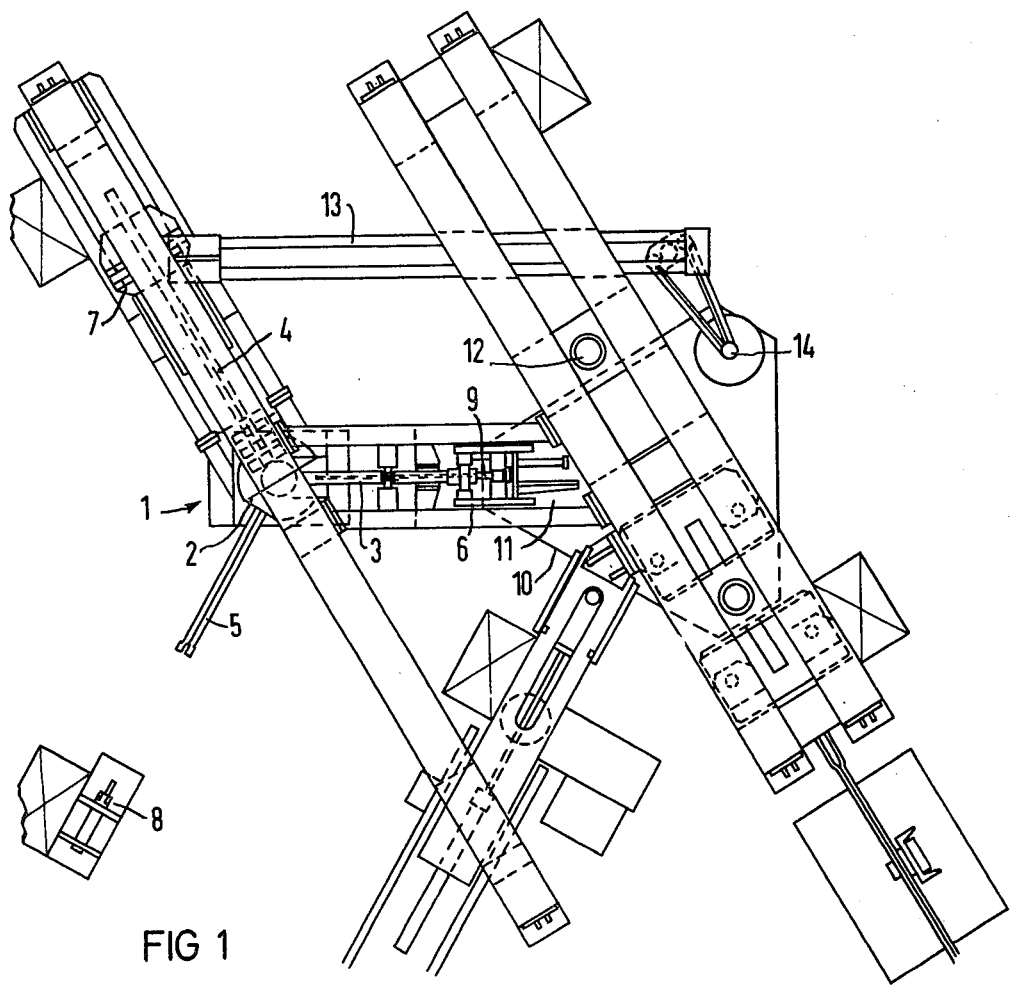
FIG. 1 is a plan view of a apparatus for assembling lamination stacks in accordance with the teachings of the invention.

In FIG. 1, a magazine 1 has three storage places which consist of carriers 3, 4 and 5 arranged horizontally on rotatable column 2. Carriers 3, 4 and 5 are spaced apart about column 2 at an angle of 120° from each other. A pickup head 6, for picking up a first quantity of laminations is associated with carrier 3. A pickup head 7 for picking up a second quantity of laminations is associated with carrier 4. A charging station 8 is provided for carrier 5. The first quantity of laminations is picked up from carrier 3 by means of pick-up head 6 which has a pick-up spindle 9 for this purpose. Pickup spindle 9 is aligned in front of carrier 3, so that laminations can be pushed by means of a hydraulically operated pusher from carrier 3 onto pickup spindle 9. When the first quantity of laminations has been pushed onto a pickup spindle 9, the hydraulic pusher is stopped. The laminations are held on pickup spindle 9 and pickup head 6 is swung up 90°. Thereupon, the laminations pushed on pickup spindle 9 are deposited on a transport pin 11 carried on a turntable 10. Turntable 10 is then advanced by one operating step, so that the lamination stack carried on transport pin 11 arrives at a measuring station 12. In measuring station 12, the lamination stack is compressed and then its length is measured. Depending on the difference between the length measured and a pre-set length, a second quantity of laminations is now picked up from carrier 4 by pickup head 7. The design of pickup head 7 is like that of pickup head 6. When the second number of laminations has been pushed onto the pickup spindle of pickup head 7, the latter, in contra-distinction to pickup head 6, is swung down 90°. By virtue of this rotation of pickup head 7 in a direction opposite to that of pickup head 6, the second, partial stack of laminations is turned 180° relative to the first partial stack of laminations.

A transport carriage 13 is associated with pickup head 7 and has a movably mounted gripper 14. The second quantity of laminations is picked up at pickup head 7 by means of the gripper 14. Gripper 14 then travels to the right on transport carriage 13 and is swung toward turntable 10. In the meantime, turntable 10 has been again advanced by one operating step, so that transport pin 11 is placed to receive the second portion of laminations from gripper 14. Therewith, the lamination stack has reached its final size. By advancing turntable 10 again, the finished lamination stack is delivered to another processing station at which the still loosely stacked laminations are joined to form a firm stack. After the individual laminations are thus joined together, the finished stack is taken off at the next operating station of turntable 10, and transport pin 11 is again free to receive new laminations.

As soon as all laminations are taken from carrier 3, the carriers are rotated by another 120° on column 2. Thereby, carrier 5, which has been replenished with new laminations by loading station 8, is positioned in front of pickup head 7, while carrier 4, which still carries laminations, is placed in front of pickup head 6. Carrier 3 can now be reloaded with new laminations by loading station 8.

The above-described arrangement of magazine 1 thus ensures that there are always sufficient laminations available for the second pick-up (by pickup head 7) without the need for separate charging or monitoring.

Figure 2:
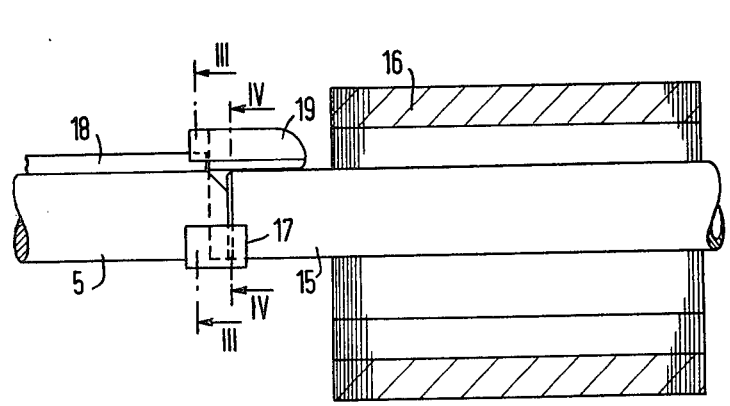
FIG. 2, shows, in partial cross-section, a side view of a stack of laminations ready to be pushed onto a carrier.

FIG. 2 shows lamination stack 16 lined up on a transport rod 15 prior to charging. One end of transport rod 15 rests on a shell-like holder 17, which is connected to carrier 5. Transport rod 15 is supported at its other end, not shown in the drawing, in charging station 8. A guide bar 18 is attached to carrier 5 for engaging a slot opening in the laminations, thus holding them, secure against rotation, on carrier 5. A guide finger 19 is placed on guide bar 18 for pushing the laminations on more easily.

Figure 3:
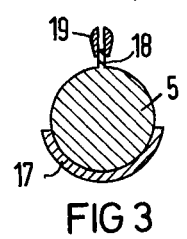
FIG. 3, is a view, in cross-section, of the guide bar, taken along line III—III of FIG. 2.
Figure 4:
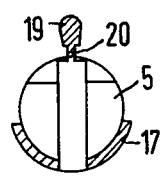
FIG. 4, is another view of the guide bar, in cross-section, taken along line IV—IV of FIG. 2.

As can be seen in FIG. 3, guide finger 19 is slotted at its rear end to engage guide bar 18. As can be seen in FIG. 4, the profile of guide finger 9 corresponds to the cross-section of the lamination slots. Guide finger 19 has a rib 20, on its side facing the guide bar, the width of which corresponds to the width of guide bar 18. Through the engagement of guide finger 19 in a slot of each lamination, the laminations are aligned exactly. After being pushed onto carrier 5, the laminations are secured in position by guide bar 18 which fits exactly into the slot opening of each lamination.

I claim:

1. In an apparatus for the assembly of lamination stacks for use in electric machines in which a first quantity of laminations is picked off, the size of the lamination stack so formed is measured at an intermediate station, and, depending upon the result of the measurement, a second quantity of laminations is taken from a magazine by a transport and pick-up device which is controlled by the measuring device, to form a final lamination stack of the desired size, the improvement comprising:

the magazine having at least three storage carriers mounted on a support at equal spacings from each other and at such an angle, with respect to the support, that laminations will be held thereon by friction;

means for picking up the first quantity of laminations from a first storage carrier and feeding it to the intermediate station;

means for picking up the second quantity of laminations from a second carrier;

means for keeping the remaining carrier loaded with new laminations; and means for advancing all carriers by one operating station when all laminations are removed from the first carrier.

2. The apparatus of claim 1, further comprising:

the support being a rotable column on which the carriers are arranged at equal angular distances from each other, the column being capable of rotating by an angle corresponding to the angular spacing of the carriers, when all laminations are taken from the first carrier.

3. An apparatus according to claim 1 or claim 2 in which:

the first quantity of laminations picked off is smaller than the number required for the final lamination stack; and means are provided for turning the second quantity of laminations 180°, relative to the first quantity of laminations, by means of the pickup device.

4. An apparatus in accordance with claim 1 or claim 2 in which each carrier has a guide bar for engaging a cutout in the laminations, and in which a guide finger for aligning the laminations is placed on the guide bar of a carrier when that carrier is being loaded.

* * * * *